Inventor
Robert L. Dennison
By
Attorney

Sept. 11, 1928. 1,684,012

R. L. DENNISON

THRUST BEARING

Filed Dec. 17, 1924 3 Sheets-Sheet 3

Inventor
Robert L. Dennison
By C. H. Parker
Attorney

Patented Sept. 11, 1928.

1,684,012

UNITED STATES PATENT OFFICE.

ROBERT L. DENNISON, OF NEW YORK, N. Y.

THRUST BEARING.

Application filed December 17, 1924. Serial No. 756,573.

This invention relates to thrust bearings, and more particularly to thrust bearings for continuous shafts.

An object of the invention is to provide a thrust bearing particularly adapted for use on shafts which must be reversed when in operation, such as the propeller shafts of steam ships.

A further object of the invention is the provision of a thrust bearing that may be adjusted longitudinally of the axis of the shaft.

A further object of the invention is the provision of a thrust bearing adapted to take up thrust in either of two opposite directions and capable of being reversed after having been in use, whereby the least worn side may be turned in the direction in which the greatest wear is encountered.

A further object is to provide a thrust bearing adapted to take up thrust in either of two directions in which either side of the bearing may be adjusted independently of the other.

Figure 1:
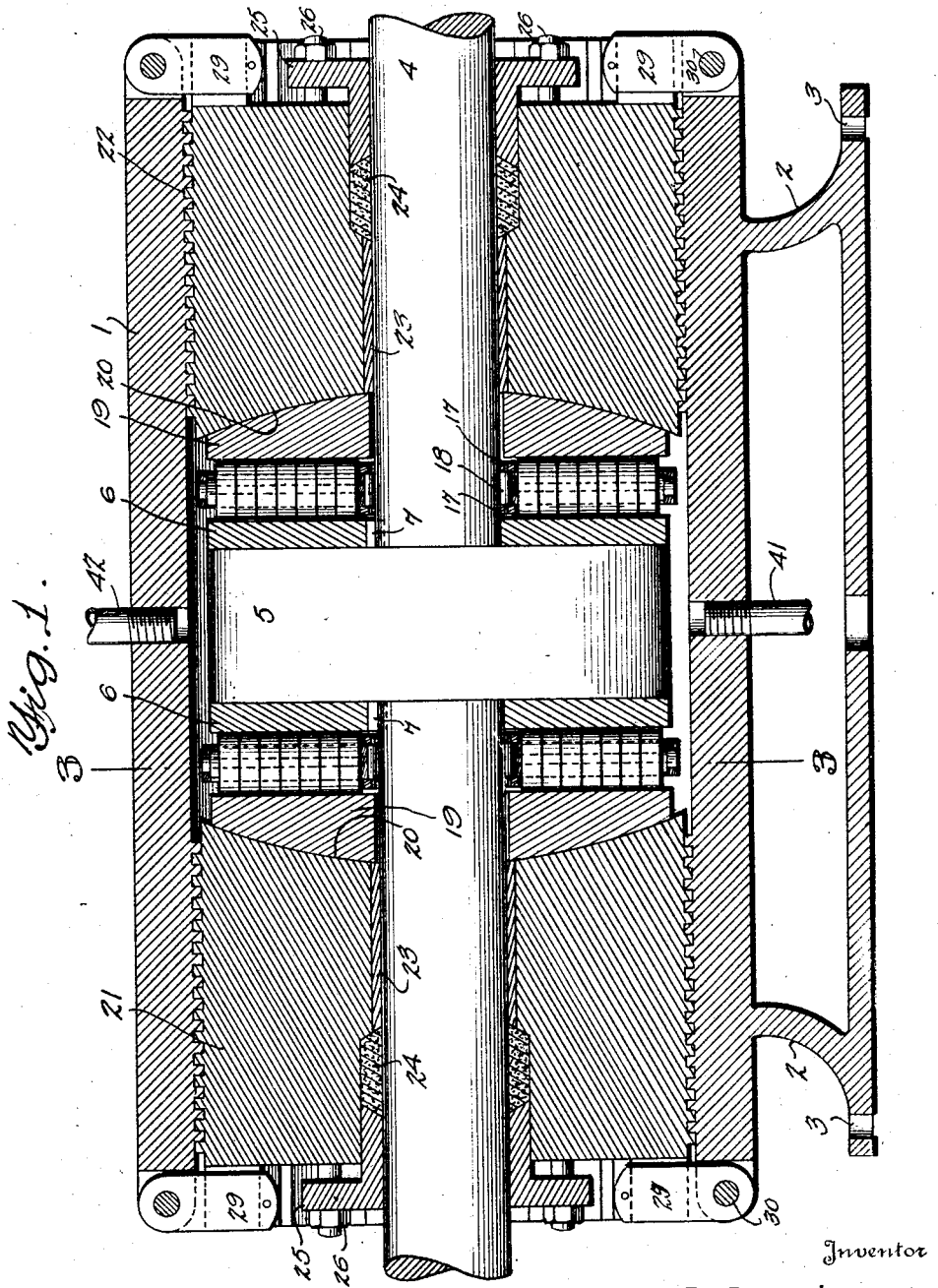
Figure 2:
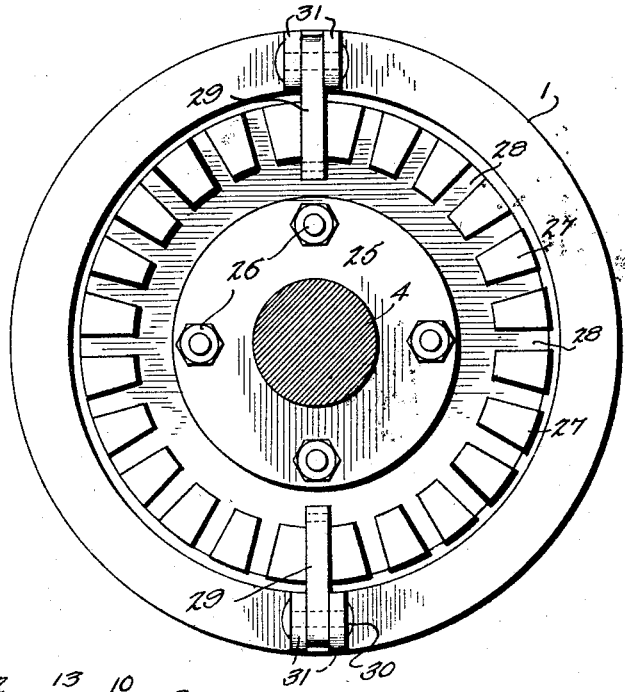
Figure 3:
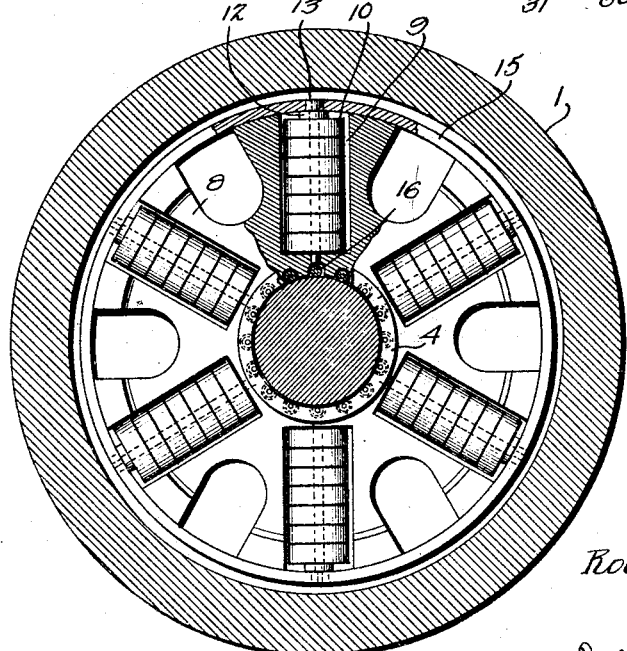
Figure 4:
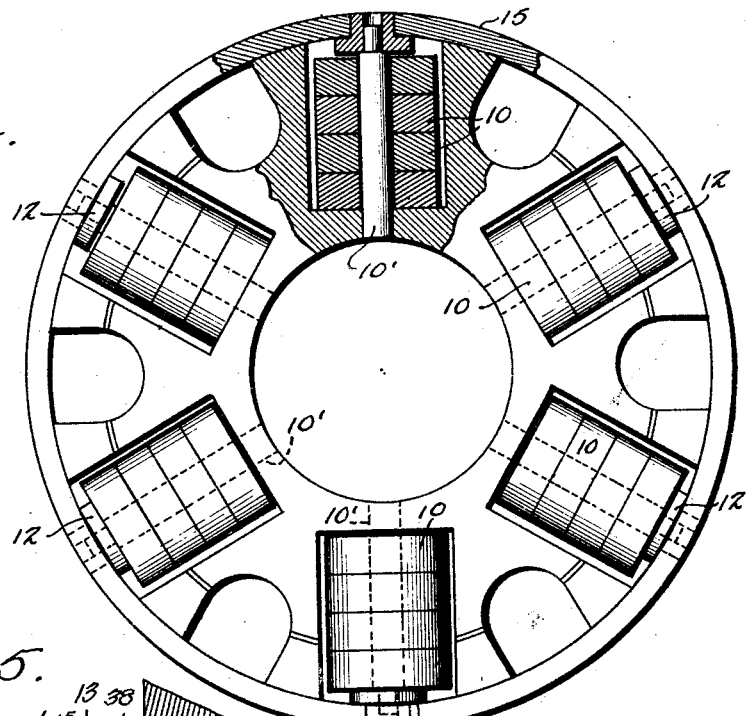
Figure 5:
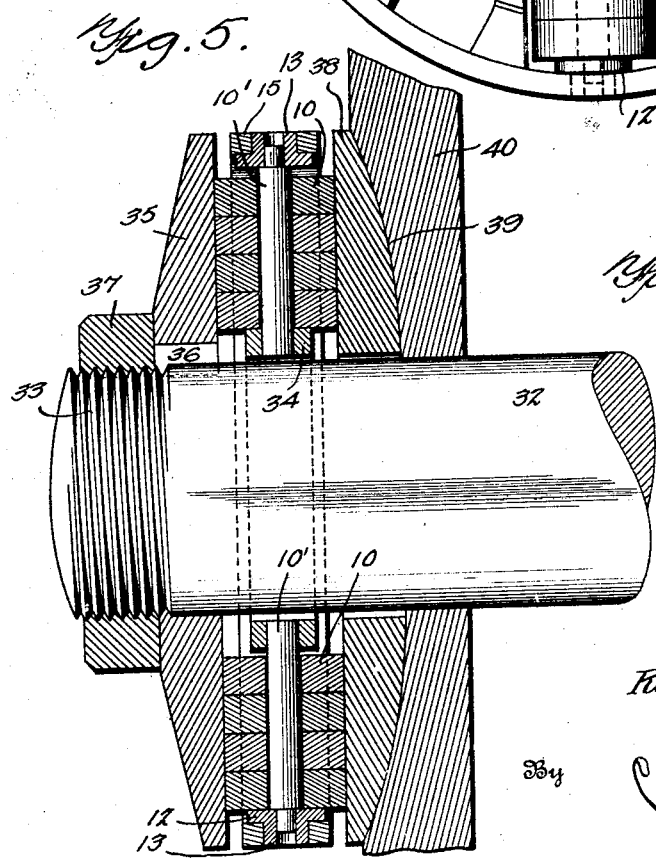
Figure 6:
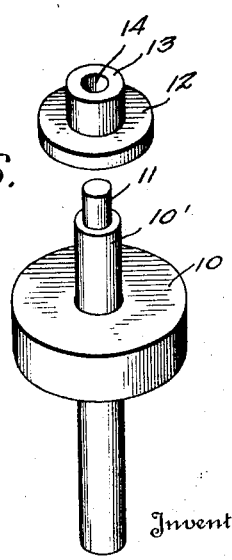

In the accompanying drawings, I have shown several embodiments of the invention. In this showing:

Figure 1 is a vertical longitudinal sectional view of a shaft showing one form of the bearing applied, Figure 2 is an end elevation, the shaft being shown in section, Figure 3 is a vertical sectional view on line 3—3 of Figure 1, Figure 4 is an end elevation of a bearing cage showing a modified form of the invention, parts being shown in section, Figure 5 is a vertical sectional view of a shaft showing the bearing shown in Figure 4, in position, and, Figure 6 is a perspective view of one of the roller bearings.

Referring to Figures 1 to 3 of the drawings, the reference numeral 1 designates an outer casing or cage which is stationary and which is mounted on a suitable base 2. The base is provided with a peripheral flange having openings 3 for the reception of suitable fastening elements by means of which the cage or frame 1 may be anchored to a stationary support, such as the deck of a ship. A shaft 4 extends through the center of the bearing cage and is provided with an enlargement 5 arranged at a point approximately centrally of the cage. The thrust bearings are arranged on each side of the enlargement and separated therefrom by case hardened plates 6, which are keyed to the shaft, as at 7, adapted to revolve therewith. The bearing cage consists of a plate or disk 8 (see Figure 3) having a plurality of substantially rectangular cut out portions 9 extending radially thereof. Suitable bearing rollers 10 are arranged in these cut out portions, and these rollers are mounted on pins or axles 10'. The outer ends of these pins are reduced in cross section, as at 11 (see Figure 6) and are adapted to be received in end members 12. As shown, the end members are provided with tubular portions 13 having openings 14 of a size to receive the reduced portion 11 of the pin and the inner portion of these members abut the shoulder formed by the reduction of the end of the pin. The tubular portions 14 of the end members are received in a ring 15, which surrounds the plate 8. In the form of the invention shown in Figures 1 to 3 of the drawings, the inner ends of the cut out portions 9 communicate with a plurality of concentric recesses 16, formed in the plate 8 adjacent its central opening. Rings 17 are arranged on opposite sides of these recesses and are adapted to receive the reduced ends of the anti-friction rollers 18 which are arranged between the shaft and the inner ends of the pins 10.

On the opposite side of the anti-friction rollers, there is provided a second case hardened plate 19, the outer face of which is convex, as at 20, and is adapted to be received in a similar shaped concavity formed on the inner face of a metal filler 21. As shown, this metal filler is arranged within the casing and is provided with external threads adapted to engage internal threads in the outer casing, as at 22, for the purpose of adjusting the bearing. The metal member 21 is provided with a central opening for the passage of the shaft, and a liner 23 formed of bronze, brass or other suitable material, is arranged in this opening. Suitable packing 24 is arranged in the central opening in the filler and is retained in position by a packing member 25. This packing member may be adjusted by means of bolts 26, which are received in the outer face of the member 21.

The outer face of the filler member 21 is provided with a plurality of spaced projections 27, forming radial grooves 28 adjacent the periphery. The casing is provided with a plurality of hinged locking members 29 mounted on pins 30, carried by pairs of spaced ears 31, whereby the filler member 21 may be retained in proper position after the bearing has been adjusted.

In Figures 4 and 5 of the drawings, I have shown the thrust bearing applied to a shaft 32 adjacent one end thereof. As shown, the shaft is threaded, as at 33, to retain the bearing thereon. In this form of the invention, the rollers 10 are mounted in substantially the same manner as heretofore described. The inner ends of the pins 10' are, however, received in an inner ring 34, parallel to the outer ring 15 and the auxiliary bearings 18 are eliminated. On the outer side of the bearing cage, there is provided a thrust plate 35, which is keyed to the shaft, as at 36, and retained in position by means of a nut 37. On the opposite side of the bearing cage, there is provided a similar plate 38 which, however, does not revolve, and which is provided with a convex face 39, adapted to be received in a concavity formed in a portion 40 of the frame of the machine.

In the form shown in Figures 1 to 3 of the drawings, the cage or casing is adapted to be filled with oil and the casing is provided with oppositely arranged openings for the reception of pipes 41 and 42 through which oil is caused to circulate through the casing. The oil is not under pressure but sufficient force is applied thereto to cause the oil to circulate.

The operation of the device will be apparent from the foregoing description. By mounting the rollers 10 on the pins 10' more even roll is obtained, as the rollers contact with the revolving plate on one side and the stationary plate on the opposite side. In each form of the invention, the end members 12 prevent outward displacement of the pins, and in the form of the invention shown in Figures 4 and 5 of the drawings, the shaft prevents inward displacement. In the form of the invention shown in Figures 1 to 3 of the drawings, the auxiliary bearings 18 are employed for this purpose and also to take up the weight that would otherwise be imposed on the shaft. It will be apparent that the entire bearing may be adjusted longitudinally by moving the two filler members 21 toward either end of the casing or that either of the bearings may be adjusted independently of the other. When the bearings are to be adjusted, the locking members 29 are swung outwardly and the filler blocks 21 rotated, causing them to move longitudinally of the outer casing. In actual operation of the form of the bearing shown in Figures 1 to 3 of the drawings, the bearing taking the end thrust when the shaft is running in a forward direction is subjected to greater wear than the bearing taking the end thrust when the shaft is in reverse, due to the fact that the shaft of the steam ship or the like will run in a forward direction a greater portion of the time. When one bearing becomes more worn than the other, the entire assembly may be reversed to subject the less worn bearing to the greater wear.

It is to be understood that the forms of my invention herewith shown and described are to be taken as preferred examples of the same and that various changes in the shape, size, and arrangement of parts may be resorted to without departing from the spirit of the invention or the scope of the subjoined claims.

I claim:

1. A thrust bearing comprising an outer frame adapted to surround a shaft, a revolving member keyed to said shaft, a bearing cage arranged adjacent said member, a stationary member surrounding said shaft and arranged on the opposite side of said bearing cage, a filler member adjustably mounted in said frame on the opposite side of said stationary member, said frame being internally threaded, said filler member being provided with external threads adapted to engage said internal threads to permit adjustment of said filler member, the outer face of said filler member being provided with a plurality of pairs of spaced projections forming grooves therebetween, and said outer frame being provided with hinged locking members adapted to be received in said grooves.

2. A thrust bearing comprising a plate adapted to be keyed to a shaft, a second plate surrounding said shaft and spaced from said first mentioned plate, a bearing cage arranged between said plates, said bearing cage comprising a disk having a plurality of cut out portions formed therein, a ring surrounding said disk, pins arranged in said cut out portions and extending radially of said shaft, end members arranged in said ring, and adapted to receive the ends of said pins, the outer ends of said pins being reduced in cross section to prevent outward displacement of said pins, and rollers mounted on said pins and contacting with said plates.

3. A device constructed in accordance with claim 2 wherein said disk is provided with a central cut out portion adapted to receive said shaft, and a plurality of anti-friction rollers arranged between said disk and said shaft.

In testimony whereof, I affix my signature.

ROBERT L. DENNISON.